UNITED STATES PATENT OFFICE.

WILLIAM M. BOVARD, OF WASHINGTON, DISTRICT OF COLUMBIA, ASSIGNOR TO NEWTON D. BAKER, SECRETARY OF WAR, TRUSTEE.

GAS-FILTER.

1,368,540.  Specification of Letters Patent.  Patented Feb. 15, 1921.

No Drawing. Application filed January 14, 1919, Serial No. 271,172. Renewed December 24, 1920. Serial No. 433,771.

(FILED UNDER THE ACT OF MARCH 3, 1883, 22 STAT. L., 625.)

*To all whom it may concern:*

Be it known that I, WILLIAM M. BOVARD, a citizen of the United States, and residing at Washington, District of Columbia, have invented certain Improvements in Gas-Filters, of which the following is a specification.

The invention described herein may be used by the Government, or any of its officers or employees, in prosecution of work for the Government, or by any other person in the United States, without payment of any royalty thereon.

The present invention relates to filters for gases carrying suspended particles, such as smoke, dust-laden air or gases carrying suspended particles of liquid.

The objects of the invention include the preparation of a material capable of being prepared in the form of sheets, cups, thimbles, etc., and having the ability to retain substantially all of the suspended particles when smoke or the like is filtered therethrough.

Another object of the invention is the preparation of a material which, though substantially impervious to the solid or liquid particles of smoke or the like, allows the maximum freedom of passage therethrough of the gases.

The invention is based on the theory that fibers of animal origin such as wool, fur, hair, etc., on account of their peculiar scaly structures have the property of entangling or otherwise retaining the solid particles when gases containing such particles suspended therein are filtered therethrough.

Heretofore, it has been customary when using these materials to confine a body or layer of them between screens or foraminous fabric and pass the gases through the filter so made. This is open to several objections such as non-uniformity of the layer, inconvenience in renewal, etc.

The present invention, therefore, comprises the preparation of fibrous material of animal origin into self-contained filtering bodies such as sheets, cups, etc., by paper making processes. The use of such processes results in the formation of a paper-like mat of the fibrous material and this term "mat" is used hereinafter to refer to such material as distinguished from felt, woven fabric or the like.

In carrying out the present invention, a suitable quantity of the animal fiber is placed in a beater along with the requisite amount of water and a smaller quantity of paper making fiber, such as rag or wood fiber. When the beating has been completed, the pulp is run onto a cylinder or Fourdrinier machine, and the fiber matted or meshed into a sheet.

It is of course obvious that suitable shapes, such as cups, etc., may be made by using the corresponding molds or forms.

One of the chief advantages of the present invention lies in the fact that in the new material short fibered wool stock and the like may readily be used. For example, shear flock, in which the fibers ordinarily do not exceed $\frac{1}{8}$ inch in length, may be made into an excellent filter by making it up with about 20–40% of longer fibered rag stock. And, such material as French noils may be used to produce a filter of high quality. Suitable proportions of the short wool-fiber stock and rag stock are about 75 and 25% respectively.

In making up compositions of animal fiber and rag stock or the like, the proportion of the former will depend to some extent upon the purpose for which the filter is to be used. For example, when resistance to the passage of gas is required to be very low, the proportion of animal fiber should be high.

When it is desired to produce a filter material having greater tensile strength, woven fabric, such as cotton netting, may be incorporated therein. Also, it may sometimes be found of advantage to incorporate with the animal fiber a moderate amount of mineral matter such as diatomaceous earth which itself is more or less porous and absorbent and has filtering properties.

Having now described the invention and the preferred form of practising the same, it is to be understood that it is not to be limited to the specific examples and proportions herein given as these may be departed from without departing from the spirit of the invention as set out in the accompanying claims.

I claim:

1. A gas filter comprising a porous paper-like mat containing animal fibers.
2. A gas filter comprising a porous paper-like mat of animal and vegetable fibers.
3. A gas filter comprising a porous paper-like mat of animal fibers with a small proportion of vegetable fiber.
4. A gas filter comprising short animal fibers matted with and held together by vegetable fibers.
5. A smoke filter comprising a mat of shear flock, held together by longer vegetable fibers.
6. A smoke filter comprising a mat of shear flock held together by longer vegetable fibers and reinforced by woven fabric.
7. A smoke filter comprising a mat of French noils held together by longer vegetable fibers.
8. A smoke filter comprising a mat of French noils held together by longer vegetable fibers and reinforced by woven fabric.
9. A smoke filter consisting of a matted mixture of about 75% short wool fiber and 25% rag stock.
10. A gas filter comprising a porous mat of animal and vegetable fibers along with porous mineral matter.
11. A smoke filter comprising a mat of shear flock and porous mineral matter held together by longer vegetable fibers.
12. A smoke filter comprising a mat of French noils and porous mineral matter held together by longer vegetable fibers.

WILLIAM M. BOVARD.